J. SIMPSON.
Clevis.
No. 214,793. Patented April 29, 1879.
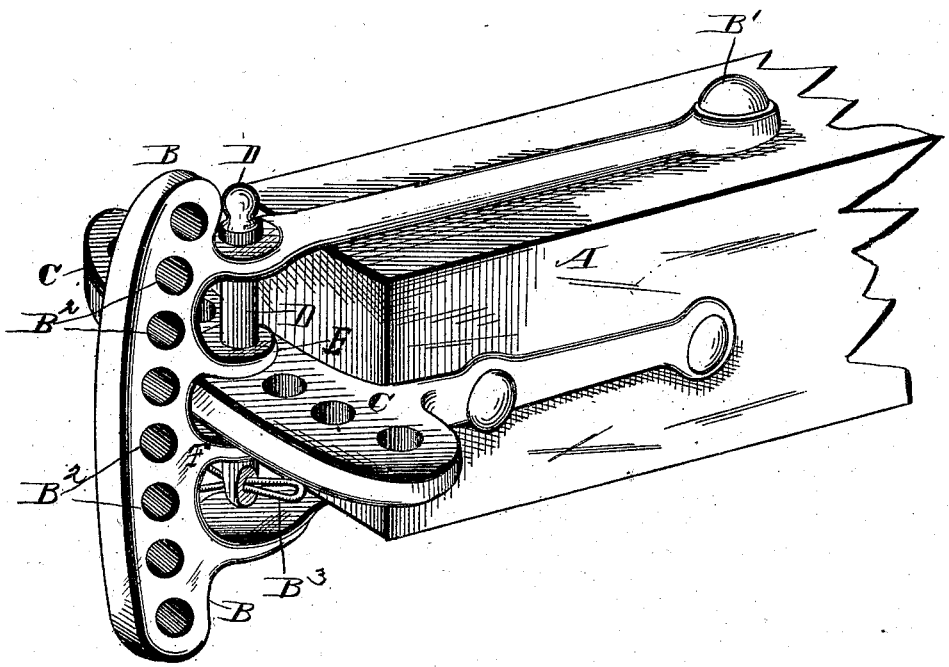
WITNESSES
E. I. Nottingham
Geo. D. Seymour
INVENTOR
John Simpson
By Leggett and Leggett
ATTORNEYS.

UNITED STATES PATENT OFFICE.

JOHN SIMPSON, OF CLEVELAND, OHIO.

IMPROVEMENT IN CLEVISES.

Specification forming part of Letters Patent No. 214,793, dated April 29, 1879; application filed February 21, 1879.

*To all whom it may concern:*

Be it known that I, JOHN SIMPSON, of Cleveland, in the county of Cuyahoga and State of Ohio, have invented certain new and useful Improvements in Clevises; and I do hereby declare the following to be a full, clear, and exact description of the invention, such as will enable others skilled in the art to which it pertains to make and use it, reference being had to the accompanying drawing, which forms part of this specification.

My invention relates to clevises for plows and other agricultural implements; and it consists in the parts and combination of parts hereinafter described and claimed.

In the drawing, the figure shows an isometric view of a clevis constructed according to my invention.

A is the end of the plow-beam, for instance. B is a vertical clevis, and C a horizontal clevis. The clevis B is attached to the beam A by a vertical bolt, $B^1$, passing through the beam; and the front of this clevis is provided with a series of holes, $B^2$, or their equivalent, whereby is provided a number of places of attachment. This clevis is intended for the vertical adjustment of the beam, so that in case of a plow a lighter or deeper furrow would be cut.

If adjustment is made at the upper portion of the clevis B, the beam A will be dropped and a deeper furrow cut; and if the lower adjustment be used, a reverse effect will follow.

$B^3$ is a device for holding the coupling-pin D, which unites the clevises B and C in the manner as shown in the drawing. The clevis C is designed to regulate the width of furrow in case of a plow, or to regulate the line of draft; and this is gaged and determined by the relative positions of the clevises B and C as fixed by the pin D.

To prevent any accidental displacement of the pin D, I propose, when desired, to provide any retaining device that may be suitable. This retaining device may be in the shape of a spring or otherwise. Anything will answer that will prevent the accidental retraction of the pin D from its position.

The vertical clevis is provided with the two horizontal arms E and F, which project inwardly toward the end of the plow-beam, and are adapted to embrace the horizontal clevis. Vertical holes are made in these arms, and through them the bolt D passes in fastening the two clevises together after they are adjusted in any desired relative position.

What I claim is—

The combination, with a horizontal clevis, of a vertical clevis provided with two horizontal arms, which embrace the former, and a bolt which passes through suitable holes formed in said arms as it fastens the clevises together in any desired relative lateral adjustment, substantially as set forth.

In testimony whereof I have signed my name to this specification in the presence of two subscribing witnesses.

JOHN SIMPSON.

Witnesses:
   JNO. CROWELL, Jr.
   F. O. McCLEARY.